United States Patent

Lowery et al.

[11] Patent Number: 5,901,993
[45] Date of Patent: May 11, 1999

[54] FOOD HANDLING TONGS

[76] Inventors: Fannie L. Lowery; Everett L. Lowery, Sr., both of 4353 Ingleside Rd., Warrensville Heights, Ohio 44128-3501

[21] Appl. No.: 09/007,675

[22] Filed: Jan. 15, 1998

[51] Int. Cl.[6] ............................................. A47J 43/28
[52] U.S. Cl. ................................................ 294/7; 294/118
[58] Field of Search ........................... 294/7, 8, 8.5, 11, 294/16, 25, 28, 29, 31.1, 62, 99.2, 106, 118, 902; 81/415, 417, 418, 424.5, 487

[56] References Cited

U.S. PATENT DOCUMENTS

| | | | |
|---|---|---|---|
| 198,678 | 12/1877 | Poole | 294/118 X |
| D. 341,997 | 12/1993 | Tanfoglio . | |
| 1,104,470 | 7/1914 | Bilson | 294/118 |
| 1,356,785 | 10/1920 | Patterson | 294/106 X |
| 1,443,692 | 1/1923 | Lagorio | 294/118 |
| 2,643,151 | 6/1953 | Zypancic | 294/118 |
| 2,653,844 | 9/1953 | Detwiler | 294/118 |
| 3,301,585 | 1/1967 | Johnson | 294/118 |
| 4,073,533 | 2/1978 | De brey et al. . | |
| 4,215,889 | 8/1980 | Rayburn | 294/118 |
| 4,577,900 | 3/1986 | Chasen | 294/16 X |
| 4,606,569 | 8/1986 | Dunn et al. . | |
| 4,904,009 | 2/1990 | Kozlinkski . | |
| 5,076,628 | 12/1991 | Rader . | |

FOREIGN PATENT DOCUMENTS 491615  3/1953  Canada ...................................... 294/7

*Primary Examiner*—Johnny D. Cherry
*Attorney, Agent, or Firm*—Sand & Sebolt

[57] ABSTRACT

Food handling tongs having a first arm and a second arm, each of which includes a front end, a rear end and a middle portion, and pivotally connected to one another in a scissors-like manner. A bottom plate is attached to an upper surface of the first arm and a top plate is attached to the lower surface of the second arm whereby the top and bottom plates move toward and away from one another as the food handling tongs are moved between open and closed positions. A plurality of parallel rows of serrated teeth are formed on an inner surface of the top and bottom plates. Each row of teeth extends between a pair of opposed sides of each plate. The rows are positioned one after the other from a front end of the plates to a rear end of the plates. The rear end of each arm includes a looped handle member which forms a finger receiving opening. A coil spring extends between the first and second arms and is positioned between the pivotal connection of the arms and the handle members to bias the food handling tongs towards the closed position.

18 Claims, 2 Drawing Sheets

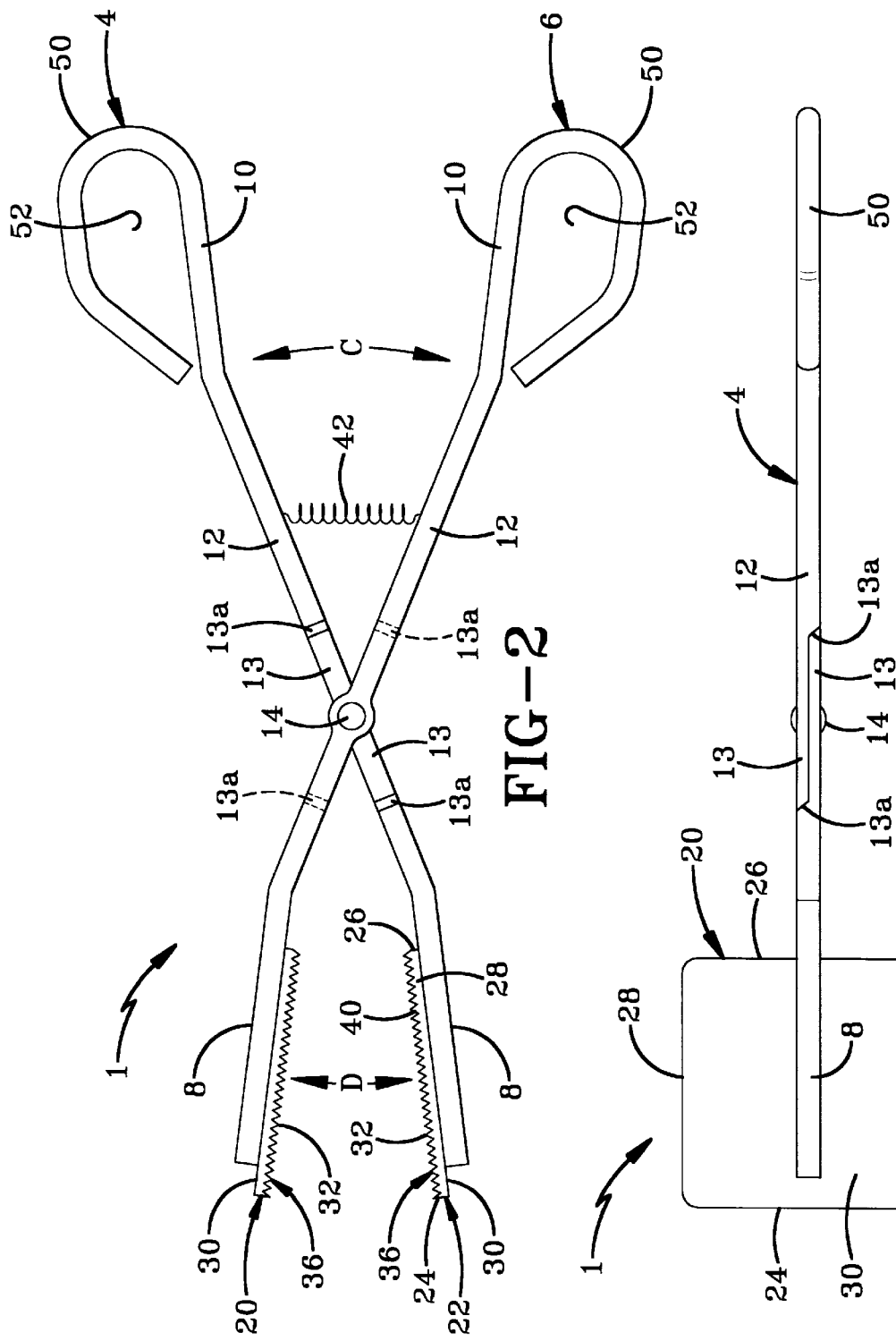

FOOD HANDLING TONGS

BACKGROUND OF THE INVENTION

1. Technical Field

Generally, the invention relates to tongs. Particularly, the invention relates to tongs for handling and grasping food. Specifically, the invention relates to tongs having top and bottom plates which pivot between open and closed positions and which include contiguous rows of serrated teeth extending across opposed surfaces of the plates.

2. Background Information

Food handling tongs are used to grasp food and allow a user to move the food without using his or her fingers. For example, food being cooked on a grill or in a frying pan is too hot to move with a user's fingers or with a short object such as a fork. Food handling tongs allow the user to grasp the hot food while preventing the user from burning his or her hands or fingers on the hot grill or pan. Another benefit to using food handling tongs is that the tongs prevent a user from passing germs from his or her fingers and hands to the food article or to adjacent food articles.

Examples of food handling tongs are shown in U.S. Pat. No. 4,073,533 which discloses food handling tongs having a pair of arms interconnected in a scissor-like manner. A grasping element extends from one end of each arm and a handle element extends from the other end of each arm. The grasping elements are curved towards one another and have drainage openings formed therein. The free end of each grasping element includes a pair of pincers for grasping relatively small articles. The handle elements extend generally perpendicular to the arms and are formed with finger receiving openings.

U.S. Pat. No. 4,606,569 discloses tongs for grasping food which include a pair of arms interconnected in a scissors-like manner. A first end of one arm includes a ladle bowl and a first end of the other arm includes a spoon, a plurality of spaced fingers extend upwardly from a side wall of the ladle bowl. When the tongs are closed, the spoon enters into the ladle bowl within the spaced fingers to securely retain the food therebetween. A pair of finger receiving openings are formed on the second end of the arms.

U.S. Pat. No. 4,904,009 discloses food handling tongs having upper and lower plates formed with a plurality of circular apertures surrounded by countersunk frusto conicle portions. The plates are attached to a pair of arms which are interconnected in a scissors-like manner. A finger receiving opening is formed at an end of each arm opposite to that of the plates. The apertures allow liquids, such as grease, to drain from the food article being handled by the tongs.

U.S. Pat. No. 5,076,628 discloses food handling tongs with serrated blade slots. The tongs include a pair of arms interconnected in a scissors-like manner. A food gripping plate is attached to one end of each arm and finger receiving handles are formed on the other end of each arm. A pair of serrated teeth defining slots is formed in each plate whereby the teeth of each slot engages the food article being handled by the tongs.

U.S. Pat. No. Des.-341,997 discloses food tongs having a pair of spaced arms biased towards an open position. A circular member is attached to an end of one arm and a semi-circular member is attached to an end of the second arm.

Although these prior art tongs are adequate for the purpose for which they are intended, these prior art tongs fail to provide parallel rows of serrated gripping teeth along the entire surface of the tong plates which bite into the food article being held therebetween and prevent the food article from slipping from its engagement with the tongs. Several of these prior art tongs are specifically designed to handle food articles of a particular shape or texture and are unsuitable for general use.

Therefore, the need exists for improved food handling tongs which provide a pair of plates having a plurality of parallel rows of serrated teeth extending along the entire surface of the plates, which are suitable for general use including handling food articles such as hamburgers and the like, and which prevent the food articles from sliding from their engagement between the plates.

SUMMARY OF THE INVENTION

Objectives of the invention include providing improved food handling tongs which allow food articles to be handled without the use of a user's hands or fingers thus preventing germs from being transferred to the food.

A further objective is to provide tongs having long arm members to allow the food articles to be removed from a hot surface preventing the user's hands or fingers from being burned.

Another objective is to provide tongs which are movable between open and closed positions.

A still further objective is to provide tongs which include handle members for moving the tongs between the open and closed positions.

Another objective is to provide tongs having a large food handling surface area capable of grasping a variety of food articles.

A further objective is to provide tongs having a plurality of gripping teeth which bite into the food article and prevent the food article from slipping from its engagement with the tongs.

Another objective is to provide tongs which are biased to a closed position; which bias can be overcome by a scissors-like motion.

A still further objective is to provide tongs which are of simple construction, which achieve the stated objectives in a simple, effective and inexpensive manner, which solve problems and satisfy needs existing in the art.

These objectives and advantages are obtained by the improved food handling tongs of the present invention, the general nature of which may be stated as including tongs for grasping objects, said tong including: a first arm having a front end, a rear end and a middle portion extending between the front and rear ends; a second arm having a front end, a rear end and a middle portion extending between the front and rear ends, said middle portion of the second arm overlapping the middle portion of the first arm; a pivot extending between the middle portion of the first and second arm to pivotally connect the first arm to the second arm and allow the tongs to move between open and closed positions; a top plate attached to the front end of the first arm, said top plate having inner and outer surfaces; a bottom plate attached to the front end of the second arm, said bottom plate having inner and outer surfaces whereby the inner surface of the bottom plate opposes the inner surface of the top plate; a spring extending between the middle portions of the first and second arms; and a pair of handle members formed on the rear end of the first and second arms.

BRIEF DESCRIPTION OF THE DRAWINGS

The preferred embodiment of the invention, illustrative of the best mode in which applicant has contemplated applying

FIG. 2 is a side elevational view of the tongs of FIG. 1 shown in an open position;

FIG. 3 is a top plan view of the tongs of FIG. 1; and

Similar numerals refer to similar parts throughout the drawings.

DESCRIPTION OF THE PREFERRED EMBODIMENT

Figure 1:
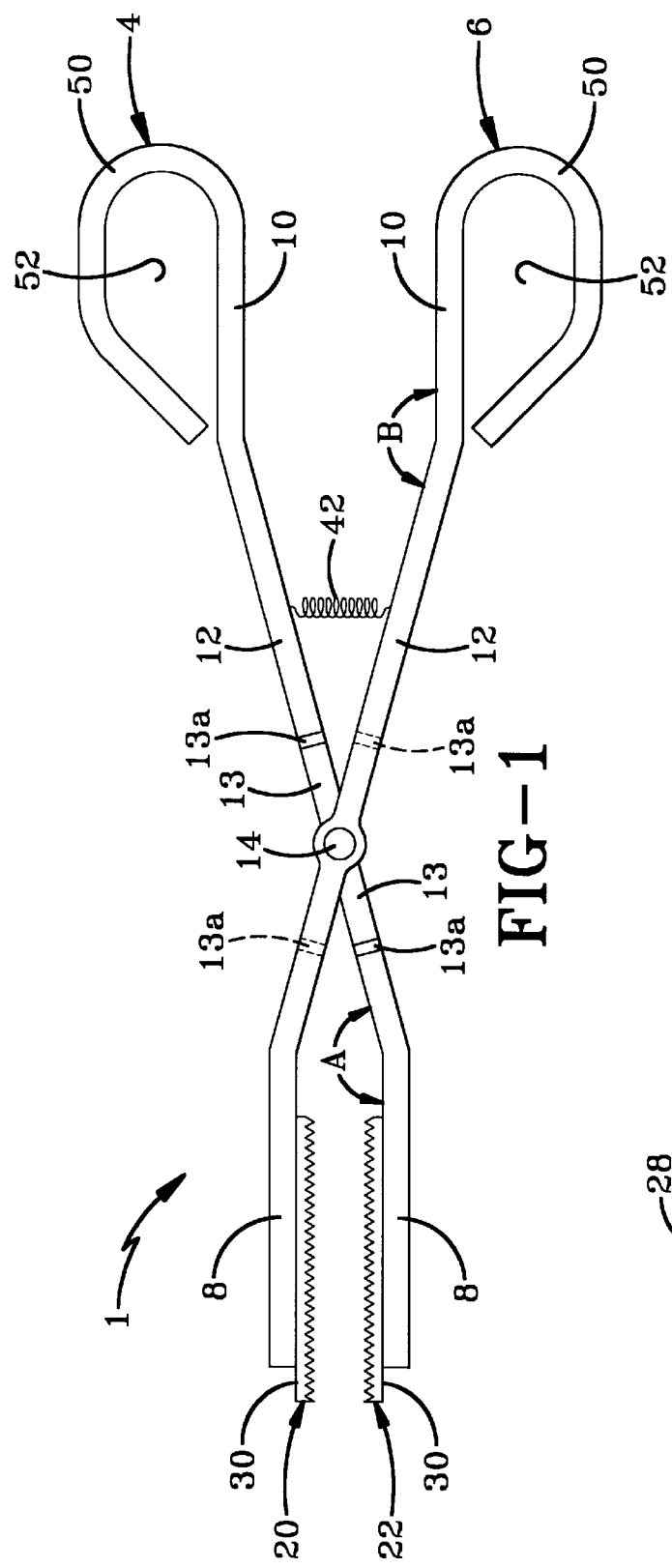
FIG. 1 is a side elevational view of the food handling tongs of the present invention.
Figure 4:
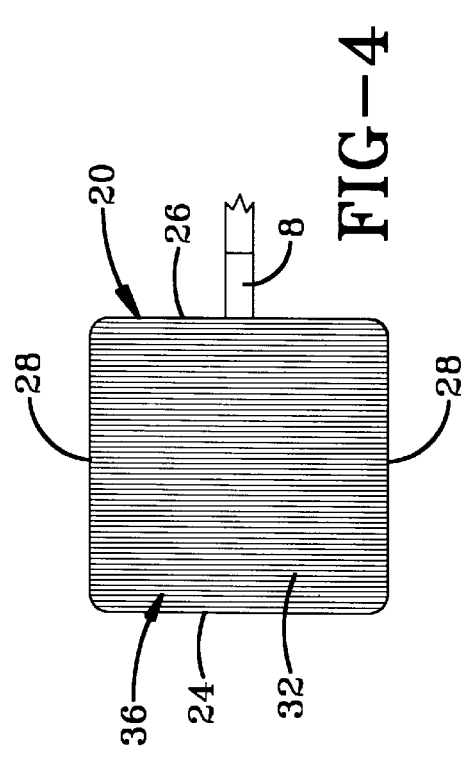
FIG. 4 is a fragmentary top plan view showing the serrated teeth of the tongs of FIG. 1.

The food handling tongs of the present invention are shown in FIGS. 1–3 and are indicated generally at 1. Tongs 1 include first and second arms 4 and 6, respectively, each of which includes a front end 8, a rear end 10 and a middle portion 12. First and second arms 4 and 6, respectively, overlap one another in a scissors-like manner and are pivotally connected together at middle portion 12 by a pivot pin 14.

Middle portions 12 each include a thin section 13 at the point of intersection of first and second arms 4 and 6. Thin sections 13 abut one another to allow first and second arms 4 and 6, respectively, to extend in a common plane. Thin sections 13 are formed with inner and outer complimentary-shaped beveled areas 13a which abut one another when food handling tongs 1 are in a closed position (FIG. 3).

As shown in FIGS. 1 and 2, arms 4 and 6 are pivotally connected in a crisscross configuration whereby front ends 8 of arms 4 and 6 are angled inwardly towards one another at an angle "A" of approximately 17° which allows front ends 8 to extend parallel to one another. Similarly, rear ends 10 of arms 4 and 6 are angled inwardly towards one another at an angle "B" of approximately 17° which allows rear ends 10 to extend parallel to one another and parallel to front ends 8.

A top plate 20 is attached to the bottom surface of front end 8 of second arm 6 and a bottom plate 22 is attached to the top surface of front end 8 of first arm 4. Plates 20 and 22 each include a front 24, a rear 26, opposed sides 28, an outer surface 30 and an inner surface 32. In the preferred embodiment, plates 20 and 22 have a square shape with rounded corners 34 extending between sides 28 and front and rear 24 and 26, respectively.

In accordance with one of the main features of the invention, a plurality of rows of serrated teeth 36 are formed on inner surfaces 32 of top plate 20 and bottom plate 22. Each row of serrated teeth 36 extends between sides 28 of top and bottom plates 20 and 22, respectively, and the rows are positioned contiguously from front 24 to rear 26 of plates 20 and 22. Each row of teeth 36 is triangular-shaped and separated from adjacent rows by a V-shaped groove 40.

In accordance with another of the features of the invention, a coil spring 42 extends between first and second arms 4 and 6, respectively, to bias food handling tongs 1 toward a closed position (FIG. 1). Coil spring 42 is attached to middle portions 12 of arms 4 and 6 and is positioned between pivot pin 14 and handle members 50. Alternatively, coil spring 42 may be a leaf spring without departing from the spirit of the present invention. Additionally, coil spring 42 may be a compression spring which biases tongs 1 to the open position without departing from the spirit of the present invention.

Each end 10 of first and second arms 4 and 6, respectively, includes a looped handle member 50 which extends outwardly and forward in the same plane as arms 4 and 6 and perpendicular to that of the respective plates 20 and 22. Handle members 50 each form a finger receiving opening 52 on rear end 10 of arms 4 and 6 for receiving a user's fingers during use of tongs 1 as described below.

In use, a user inserts his or her fingers through finger receiving openings 52 of handle members 50 and applies an outward pressure in the direction of arrow C. Tongs 1 are opened (FIG. 2) in a scissors-like manner separating top plate 20 from bottom plate 22 as shown by arrow D. Food handling tongs 1 are moved to engage a food article (not shown) between serrated teeth 36 of top and bottom plates 20 and 22, respectively. The user then squeezes handle members 50 towards one another which, in turn, causes plates 20 and 22 to pivot to the closed position sandwiching the food article therebetween. Coil spring 42 assists the movement of handle members 50 towards one another and helps retain food handling tongs 1 in the closed position.

Serrated teeth 36 grip the food article to prevent the food article from slipping from its sandwiched engagement between top and bottom plates 20 and 22, respectively. The jagged triangular-shaped teeth and adjoining V-shaped grooves 40 allow plates 20 and 22 to grip the outer surface of the food article allowing the food article to be transferred from a hot grill or frying pan to a plate, for example.

Although top and bottom plates 20 and 22, respectively, are shown in FIG. 3 having a square shape, plates 20 and 22 maybe formed of various shapes, such as a rectangle or circle, without affecting the concept and spirit of the invention. Further, front and rear ends 8 and 10, respectively, of arms 4 and 6 are shown extending at a 17° angle from middle portion 12, but they may extend at angles of various degrees depending on the length of coil spring 42 and the distance between plates 20 and 22 that is desired to place food tongs 1 in the closed position.

Accordingly, food handling tongs 1 are used in a scissors-like manner to grasp a food article for movement of the food article between two locations. Top and bottom plates 20 and 22, respectively, pivot toward and away from one another allowing serrated teeth 36 to engage the outer surface of the food article and prevent the food article from slipping from its sandwiched position between plates 20 and 22. Coil spring 42 biases food tongs 1 towards the closed position by applying an inward pressure to first and second arms 4 and 6, respectively.

Accordingly, the improved food handling tongs is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved food handling tongs is constructed and used, the characteristics of the construction, and the advantageous, new and useful results obtained; the new and useful structures, devices, elements, arrangements, parts and combinations, are set forth in the appended claims.

We claim:

1. Tongs for grasping objects, said tongs including:
   a first arm having a front end, a rear end and a middle portion extending between the front and rear ends;
   a second arm having a front end, a rear end and a middle portion extending between the front and rear ends, said middle portion of the second arm overlapping the middle portion of the first arm;
   a pivot extending between the middle portions of the first and second arms to pivotally connect the first arm to the second arm and allow the tongs to move between open and closed positions;
   a top plate rigidly attached to the front end of the first arm, said top plate having inner and outer surfaces;
   a bottom plate rigidly attached to the front end of the second arm, said bottom plate having inner and outer surfaces whereby the inner surface of the bottom plate opposes the inner surface of the top plate;
   a spring extending between the middle portions of the first and second arms;
   a pair of handle members formed on the rear ends of the first and second arms; and
   said spring simultaneously biasing said top plate toward said bottom plate and biasing said pair of handle members together.

2. The tongs defined in claim 1 in which a plurality of rows of serrated teeth extend contiguously across the inner surface of the top plate and bottom plate.

3. The tongs defined in claim 2 in which the top and bottom plates each include a front end, a rear end and a pair of opposed sides.

4. The tongs defined in claim 3 in which each row of serrated teeth extends between the opposed sides of the top and bottom plates.

5. The tongs defined in claim 4 in which the rows of serrated teeth are spaced and parallel to one another and extend one after the other from the front end to the rear end of each of the top and bottom plates.

6. The tongs defined in claim 5 in which the rows of serrated teeth are triangular-shaped and separated from one another by a V-shaped groove.

7. The tongs defined in claim 6 in which the front end of each arm extends at an angle relative to the middle portion which is substantially equal to between 15° and 20°.

8. The tongs defined in claim 7 in which the front ends extend at an angle relative to the middle portion approximately equal to 17°.

9. The tongs defined in claim 6 in which the rear end of each arm extends at an angle to the middle portion in a range of 15–20°.

10. The tongs defined in claim 9 in which the rear ends extend at an angle relative to the middle portion approximately equal to 17°.

11. The tongs defined in claim 6 in which the first and second arms extend in a common plane.

12. The tongs defined in claim 11 in which the top and bottom plates extend in a plane perpendicular to the plane of the first and second arms.

13. The tongs defined in claim 12 in which the handles extend in the same plane as the first and second arms.

14. The tongs defined in claim 13 in which the spring is attached to each arm between the pivot and the rear end thereof.

15. The tongs defined in claim 1 in which the top and bottom plates are square-shaped.

16. Tongs for grasping objects, said tong including:
    a pair of substantially identical grasping members, each grasping member having a front end, a rear end, a middle portion extending between said front and rear ends, a substantially planar plate rigidly attached to said front end, said plate having an inner surface, and a handle member formed on said rear end;
    said middle portions overlapping each other such that said inner surfaces face each other;
    a pivot extending between said middle portions to pivotally connect said grasping members together and to allow said tongs to move between open and closed positions;
    a spring extending between said middle portions;
    said handle members forming loops extending away from each other and outwardly from said rear ends;
    said handle members extending in a common plane;
    said plates extending in planes perpendicular to the plane containing said handle members;
    said spring biasing said tongs toward a closed position;
    said spring simultaneously biasing said plates together and biasing said handle members together;
    said plates containing a plurality of rows of parallel serrated teeth extending across said inner surfaces; and
    said teeth being substantially triangular-shaped and separated from one another by a substantially V-shaped groove.

17. The tongs as set forth in claim 16 wherein said front and rear ends of both grasping members extend from said middle portions at angles between 15° and 20°.

18. The tongs as set forth in claim 17 wherein said plates are spaced apart when parallel with each other.

* * * * *